(12) United States Patent
Balakrishnan et al.

(10) Patent No.: US 8,011,208 B2
(45) Date of Patent: Sep. 6, 2011

(54) REDUCTION OF OPTICAL FIBER CANE/PREFORM DEFORMATION IN CONSOLIDATION

(75) Inventors: Jitendra Balakrishnan, Ithaca, NY (US); Samir Khanna, Naperville, IL (US); Chukwuemeka Benneth Onuh, Wilmington, NC (US); Sonya Marie Raney, Wrightsville Beach, NC (US); Pushkar Tandon, Painted Post, NY (US); Dana Craig Bookbinder, Corning, NY (US)

(73) Assignee: Corning Incorporated, Corning, NY (US)

( * ) Notice: Subject to any disclaimer, the term of this patent is extended or adjusted under 35 U.S.C. 154(b) by 597 days.

(21) Appl. No.: 12/072,013

(22) Filed: Feb. 22, 2008

(65) Prior Publication Data

US 2008/0271495 A1 Nov. 6, 2008

Related U.S. Application Data

(60) Provisional application No. 60/903,995, filed on Feb. 28, 2007.

(51) Int. Cl.
*C03B 37/018* (2006.01)
(52) U.S. Cl. ............... 65/377; 65/384; 65/421; 65/427
(58) Field of Classification Search ............. 65/377, 65/384, 421, 427
See application file for complete search history.

(56) References Cited

U.S. PATENT DOCUMENTS

| | | | | |
|---|---|---|---|---|
| 3,826,560 | A | | 7/1974 | Schultz ............... 350/96 |
| 4,148,621 | A | | 4/1979 | Gliemeroth ............ 65/3 |
| 4,165,223 | A | | 8/1979 | Powers ................. 65/2 |
| 4,173,305 | A | | 11/1979 | Blankenship ......... 239/79 |
| 4,318,726 | A | * | 3/1982 | Edahiro et al. ....... 65/413 |
| 4,362,542 | A | | 12/1982 | Macedo et al. ..... 65/3.11 |
| 5,356,449 | A | * | 10/1994 | Kuwahara et al. .... 65/421 |
| 5,656,057 | A | * | 8/1997 | Brown et al. ........ 65/384 |
| 2005/0063663 | A1 | * | 3/2005 | Anderson et al. ... 385/142 |

FOREIGN PATENT DOCUMENTS

WO  WO2005/021455  3/2005

* cited by examiner

*Primary Examiner* — John Hoffmann
(74) *Attorney, Agent, or Firm* — Svetlana Z. Short

(57) ABSTRACT

According to an embodiment of the invention a method of manufacturing optical fiber cane comprises the steps of: (i) providing a core rod manufactured of relatively low viscosity glass; (ii) depositing $SiO_2$ based soot around the core rod to form a soot preform, the soot being of relatively high viscosity material such that the softening point of the low viscosity glass is at least 200° C. lower than the viscosity of the high viscosity outer core region; and (iii) consolidating the soot of the soot preform by exposure to hot zone at temperatures of 1000° C.-1600° C. The soot is consolidated by heating the outer portion of the soot preform at a relatively fast heating rate, the heating rate being sufficient to densify the soot, so as to render the densified material with enough rigidity to confine the heated core rod and to prevent the heated core rod from puddling.

21 Claims, 10 Drawing Sheets

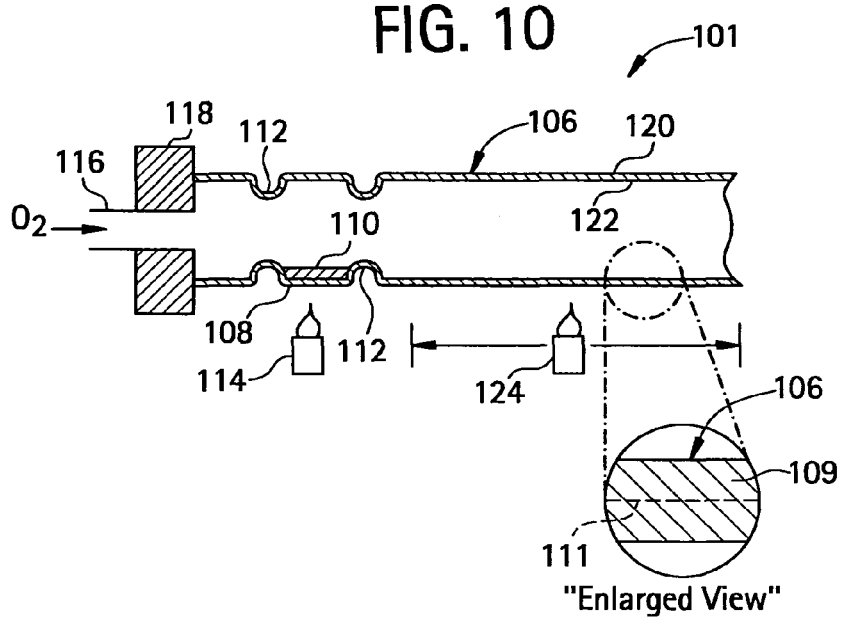
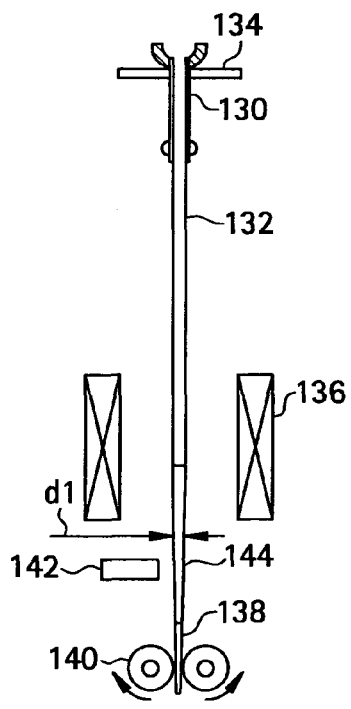
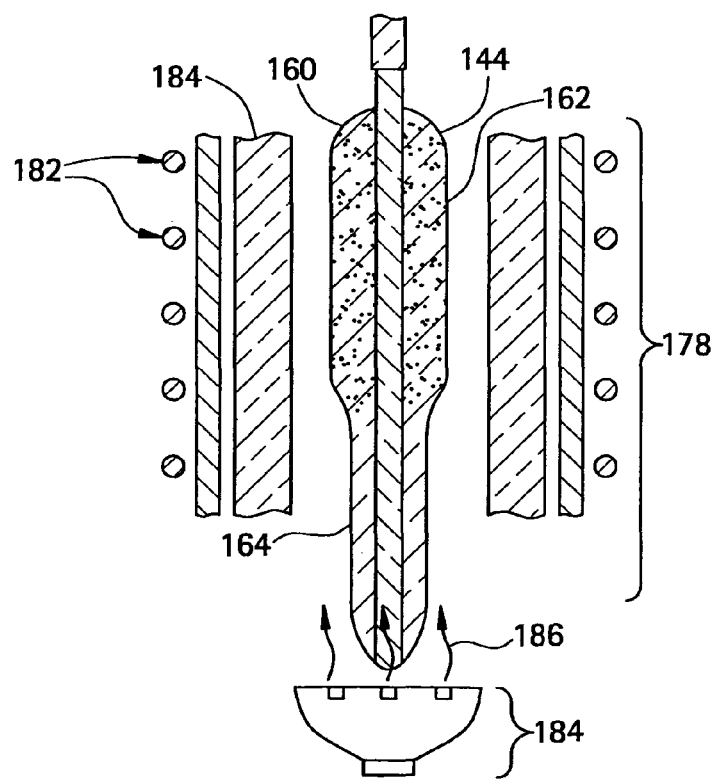

REDUCTION OF OPTICAL FIBER CANE/PREFORM DEFORMATION IN CONSOLIDATION

This application claims the benefit of U.S. Provisional Application No. 60/903,995, filed Feb. 28, 2007, entitled "Reduction of Optical Fiber Cane/Preform Deformation in Consolidation".

BACKGROUND OF THE INVENTION

1. Field of the Invention

The present invention relates generally to formation of optical fiber canes with low viscosity core, and more particularly to formation of optical fiber core canes with alkali doped inner core.

2. Technical Background

An optical fiber cane is typically manufactured by depositing glass soot on the inner core glass rod to form a porous soot preform, and then consolidating the soot to form the outer core, by moving the preform through a heat zone to consolidate the soot.

SUMMARY OF THE INVENTION

According to an embodiment of the invention a method of manufacturing optical fiber cane comprises the steps of: (i) providing a core rod manufactured of relatively low viscosity glass; (ii) depositing $SiO_2$ based soot around the inner core rod to form a soot preform, the soot being of relatively high viscosity material such that the softening point of the low viscosity glass is at least 200° C. lower than the viscosity of the high viscosity outer core region; and (iii) consolidating the soot of the soot preform by exposure to hot zone at temperatures of 1000° C.-1600° C. The soot is consolidated by heating the outer portion of the soot preform at a relatively fast heating rate, the heating rate being sufficient to densify the soot, so as to render the densified material with enough rigidity to confine the heated core rod and to prevent the heated core rod from puddling. Preferably, the density of the soot reaches at least 0.9 g/cc before the core rod's viscosity drops below $2 \times 10^7$ Poise.

According to an embodiment of the invention a method of manufacturing optical fiber cane comprises the steps of: (i) providing an inner core rod manufactured of relatively low viscosity glass such that its softening point, $T_{s1}$, (temperature at which viscosity is $10^{7.6}$ poise) is less than or equal to 1470° C.; (ii) depositing $SiO_2$ based soot around the inner core rod to form a soot preform, the soot made of relatively high viscosity material such that its softening point, $T_{s2}$ (temperature at which viscosity is 107.6 poise) greater than or equal to 1600° C. where the softening point of the low viscosity glass is at least 200° C. lower than the viscosity of the high viscosity outer core region and (iii) consolidating the soot of the soot preform by exposure to hot zone at temperatures of 1000° C.-1600° C., by heating the outer portion of the soot preform at a relatively fast heating rate, the heating rate being sufficient to densify the soot before the inner core rod softens sufficiently to start puddling. Preferably, the relatively fast heating rate is at least 6° C./min. For example, the this heating rate may be at least 7° C./min, or it may be 12° C./min, 25° C./min, 50° C./min; 60° C./min; 75° C./min, 100° C./min, or any value there between. These heating rates may be achieved, for example, by moving the preform at a relatively high speed through a non-isothermal hot zone (i) the heating elements relative to the soot preform, or the soot preform relative to the heating elements. This speed may be, for example, 25 mm/min, 30 mm/min, 35 mm/min, 40 mm/min, 50 mm/min, 100 mm/min, 150 mm/min, 200 mm/min, or any speed there between, or by increasing the heating element(s) temperature with time. Preferably, the density of the soot reaches at least 0.9 g/cc before the inner core rod viscosity drops below $2 \times 10^7$ Poise.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

One advantage of the present invention reduction or eliminate of "puddling", which advantageously increases the amount of usable cane after consolidation. Another advantage is reduction or elimination of uneven dopant redistribution, reduction in distortion and increase in the usable length of the blank, resulting in cost savings, as well as improved process control and better fiber attributes.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

BRIEF DESCRIPTION OF THE DRAWINGS

FIG. 10 depicts a method for doping a glass tube with an alkali metal oxide;

FIG. 11 illustrates a process for drawing a glass rod according to one embodiment of the present invention; and FIG. 12 illustrates a partially cross-sectional side view of a soot preform in a consolidation furnace.

DETAILED DESCRIPTION OF THE PREFERRED EMBODIMENTS

Figure 1:
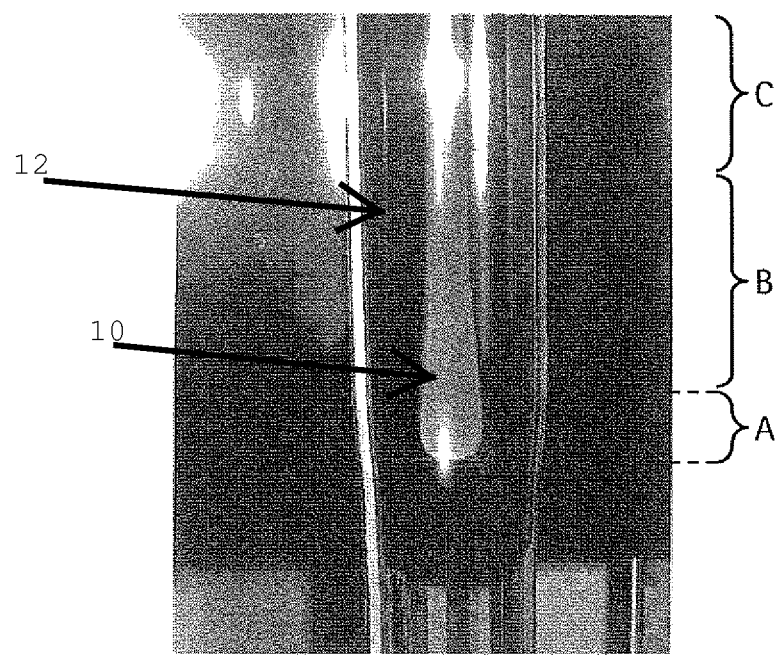
FIG. 1 is a photograph of an optical fiber cane with distorted inner core.

According to the embodiments of the present invention an optical fiber cane is manufactured by depositing glass soot on the inner core alkali doped glass rod to form a porous soot preform, and then consolidating the soot to form the outer core, by moving the preform through a heat zone at a rate sufficient to consolidate the soot.

During outer core (also referred to as overclad herein) consolidation, the preform shrinks radially and axially. We observed a bulge or distortion at the bottom of the inner core rod with respect to the outer core region. This phenomenon had not been observed previously when consolidating soot which was deposited onto other types of core rods (for example, germania doped silica canes used to make standard single mode optical fiber preforms). We hypothesized that this distortion, also termed "puddling", was the result of the of the inner core rod region having a relatively low viscosity (as in the case of alkali doped core cane) compared to the surrounding overclad (outer core) region, that is caused by movement of low viscosity inner core glass to the bottom region of the optical preform during the consolidation process. This puddling also resulted in enrichment of alkali concentration in the bottom region at the expense of upper regions of the preform. Because of the enrichment, the bottom region alkali concentration was higher than the optimum range needed for low loss fiber, while the upper region had concentration that was lower than the optimum range. Consequently, the "puddling" phenomena significantly decreased the amount of usable core cane (comprised of inner core area and outer core area) after consolidation for subsequent processing of making low loss fiber. More specifically, during consolidation, the preform is subjected to temperatures high enough for viscous sintering of the soot to occur. As the sintering occurs, the soot density increases from the range of 0.2-0.7 g/cc, depending on the laydown conditions, to the density of solid glass of approximately 2.2 g/cc. This process is accompanied by radial and axial shrinkage of the blank, in order for the mass to remain constant with increasing density. During consolidation of the outer core region, the glass shrinkage process creates radial and axial stresses on the solid glass inner core rod.

Based on our hypothesis, for most optical fiber compositions, the inner core viscosity is high enough for the core to retain it rigidity during the consolidation process, thus creating low distortion. In the case of alkali doped inner core rods, the inner region glass has softening point that is often more than 200° C. lower than the corresponding softening point of the outer core region. Because the viscosity of the inner core region is low at the temperatures required to consolidate the outer core region, the stresses and flow generated during sintering are sufficient to cause deformation of the inner core cane relative to the outer core region and cause puddling. At low soot densities during sintering, the soot too easily deforms with the inner core to accommodate the expanding inner core bulge with respect to the outer core at the bottom of the preform, and a corresponding narrowing of the inner core with respect to the outer core at the top of the preform.

Figure 2:
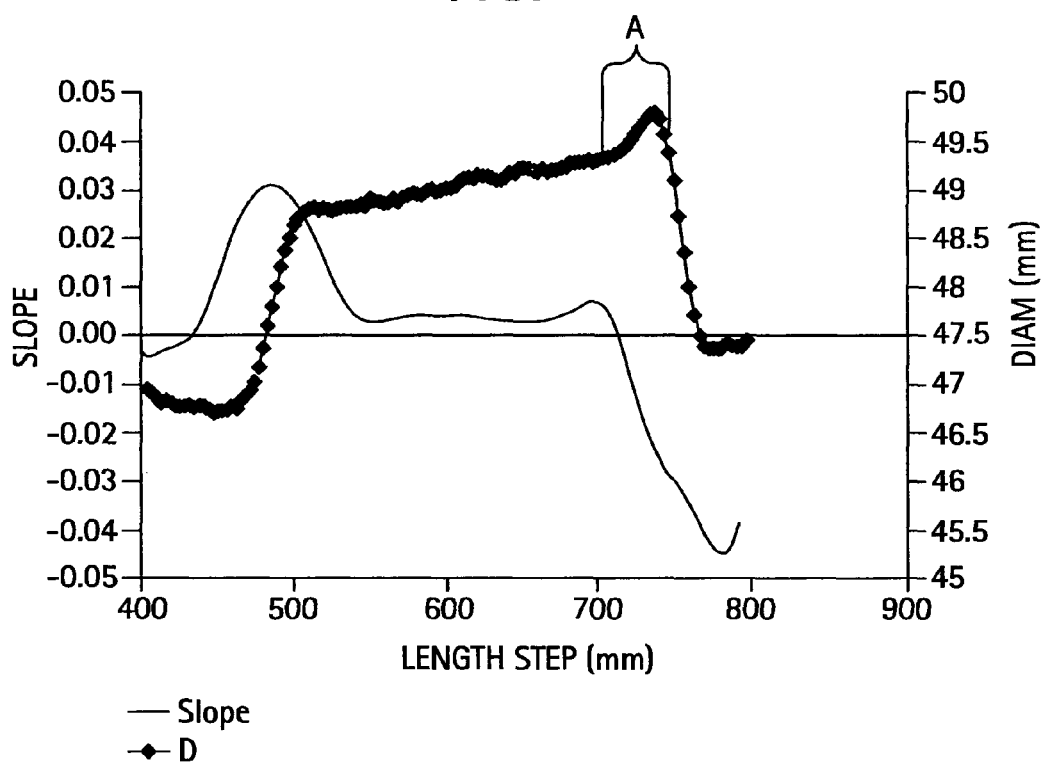
FIG. 2 is a graph of measured a variation of the distorted inner core diameter after preform consolidation.

The opticore fiber canes, where puddling is observed, have a smaller usable length than the overall blank length. In addition, as described above, the puddling phenomenon also causes the distribution of dopants in the inner region to change, thus introducing error and uncertainty into the manufacturing process. For example, FIG. 1 illustrates an optical fiber cane that includes consolidated inner core region overclad with silica—that is a core blank that includes an alkali doped inner core 10 and a silica outer core 12. This figure illustrates puddling of the inner core 10 during consolidation. More specifically, it illustrates the inner core 10 has been distorted, and that it has a bulge (region A). In addition to the geometrical distortion, the region A of the core rod has too much alkali dopants, while region C (narrowing of inner core region with respect to the outer core region) does not have enough, thus, at least from the alkali dopant requirement, only B region of the cane may be usable. FIG. 2 is a graph of measured a variation of the distorted inner core diameter (i.e., inner core rod diameter vs. axial distance), after consolidation. This figure illustrates that the inner core diameter has increased from about 48.75 mm to about 49.75 mm, and that much of diameter increase occurred (49.25 mm to 49.75 mm) in relatively small region A of the inner core 10 due to the puddling during the consolidation process.

In accordance with some the embodiments of the invention, a method of manufacturing optical fiber cane includes the steps of: (i) providing a core rod 144 manufactured of relatively low viscosity glass (for example a glass having a softening temperature $T_{s1}$, at $10^{7.6}$ poise of less than or equal to 1470° C.) glass; (ii) depositing $SiO_2$ based soot 162 around the inner core rod 144 to form a soot preform 160, the soot made of relatively high viscosity material (for example, a material with softening point, $T_{s2}$, at $10^{7.6}$ poise of greater than or equal to 1600° C.); and (iii) forming the fiber cane by consolidating the soot of by exposure to a hot zone at temperatures of 1000° C.-1600° C., where the softening temperature of the low viscosity glass is at least 200° C. lower than softening temperature of the glass in the high viscosity outer core region. Preferably, the soot is consolidated by heating the outer portion of the soot preform at a relatively fast heating rate, the heating rate being sufficient to densify the soot, so as to render the densified material with enough rigidity to (a) densify the soot to form a glass clad outer core region and (b) maintain the ratio of change of inner core/outer core diameter within 10%, more preferably within 5%. That is, preferably, the ratio of inner core/outer core diameter is maintained within less than +/−5% at least over 80% of the inner core length in the consolidated blank (i.e., ((inner diameter/outer diameter)−average of (inner diameter/outer diameter))/(average of (inner diameter/outer diameter)) is less than +/−0.05 over 80%, and preferably over 98% of the inner core length in the consolidated blank. Preferably, the density of the soot reaches at least 0.9 g/cc before the inner core (also referred to as a core rod, inner core rod, or core cane herein) softens sufficiently such that inner core viscosity drops below $2 \times 10^7$ Poise.

Relatively low and relatively high viscosity materials/glasses are two glasses that have the absolute softening temperature difference $\Delta T = T_{s2} - T_{s1}$ (with temperatures $T_{s2}$ and $T_{s1}$ measured at $10^{7.6}$ poise) of at least 100° C. In some embodiments, $\Delta T = T_{s2} - T_{s1}$, (with temperatures $T_{s2}$ and $T_{s1}$ measured at 107.6 poise) is at least 150° C. In some embodiments, $\Delta T = T_{s2} - T_{s1}$, (with temperatures $T_{s2}$ and $T_{s1}$ measured at $10^{7.6}$ poise) is at least 200° C.

A low viscosity glass may be, for example, glass containing $K_2O$, $Na_2O$, $LiO_2$, $Rb_2O$, $Cs_2O$, and mixtures thereof. The alkali metal oxide is preferably present in the cane in an average concentration in the core cane of at least 0.5 mole % (% by mole, preferably between about 0.5 to 2.5 mole %, more preferably between about 0.5 to 2 mole %, more preferably between 0.5 and 1.5 mole %, more preferably between about 0.75 to 1.25 mole %. By average concentration as used herein, we mean the average concentration over the entire core. Thus, for example, if the inner 50 percent of the core exhibits 0.5 ppm by mole $K_2O$, and the outer 50 percent of the core exhibits 200 ppm by mole $K_2O$, the average concentration of $K_2O$ in the core would be 174 ppm by mol. Preferably, the silica based core rod (i.e., inner core rod) rod also comprises fluorine and chlorine. Preferably, the silica based core rod also comprises fluorine and chlorine.

Conversion from mole % to weight % is well known in glass art; a list of exemplary compounds and their corresponding molecular weights used in optical fiber manufacturing is shown below.

TABLE 1

| Compound | molecular weight (g/mole) |
| --- | --- |
| $SiO_2$ | 60.0 |
| $GeO_2$ | 104.6 |
| $Li_2O$ | 29.9 |
| $Na_2O$ | 62.0 |
| $K_2O$ | 94.2 |
| $Rb_2O$ | 186.9 |
| $Cs_2O$ | 281.8 |
| MgO | 40.3 |
| CaO | 56.1 |
| SrO | 103.6 |
| $B_2O_3$ | 69.6 |
| $Al_2O_3$ | 102.0 |
| $P_2O_5$ | 141.9 |
| F | 19.0 |

According to some embodiments of the invention the soot corresponding to the outer core region is consolidated by heating the soot preform at a relatively fast heating rate, the rate of heating being sufficient to densify the soot, so as to render the densified material with enough rigidity to confine the heated core rod so as to prevent puddling of the heated core rod. Preferably the density of the densified material (soot) reaches at least 0.9 g/cc before the core rod softens sufficiently such that core rod viscosity drops below $2 \times 10^7$ Poise.

Preferably (i) the ratio of the change of inner core diameter to outer core (blank) diameter is kept to less than 10%, and preferably to less than 5% along any 80% the axial length of the consolidated preform, and/or (ii) the alkali concentration is constant (when measured at the same radius) along the length of the consolidated rod within plus or minus 10%, more preferably within 5% of the average alkali concentration.

According to some embodiment this heating rate is sufficient to densify the soot before the core rod softens sufficiently to puddle. Preferably, the relatively fast heating rate is at least 6° C./min. For example, the this heating rate may be at least 7° C./min, or it may be 12° C./min, 25° C./min, 50° C./min; 60° C./min; 75° C./min, 100° C./min, or any heating rate therebetween. These heating rates may be achieved, for example, by moving the preform relative to a non-isothermal hot zone at a relatively high speed through a non-isothermal hot zone (my moving either the heating elements relative to the soot preform, or the soot preform relative to the heating elements). This speed may be, for example, 25 mm/min, 30 mm/min, 35 mm/min, 40 mm/min, 50 mm/min, 100 mm/min, 150 mm/min, 200 mm/min, or any speed there between, or by increasing the heating element(s) temperature with time. Alternatively the heating rate(s) may be achieved by increasing the heating element(s) temperature with time (also referred to as bulk sintering).

Applicants also discovered that puddling can be minimized by minimizing the temperature on the core rod, for example by utilizing fast sinter rates of the outer core soot. In doing so, we provide enough heat/time for the blank to sinter, but minimize the time of exposure of the core rod 144 to high axial and radial temperatures.

Figure 3:
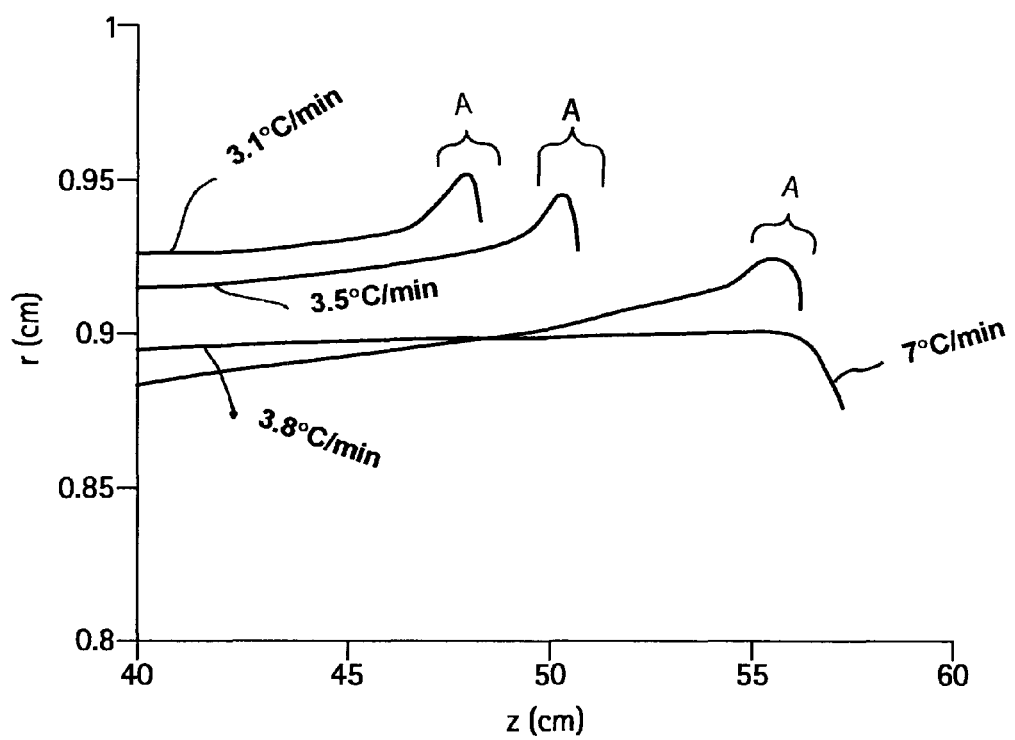
FIG. 3 is a plot of the lower axial portion (z) of the inner core (alkali doped core cane) radii of four different optical preforms. These plots correspond to three inner core rods wherein the deposited soot was consolidated at a relatively low down-drive speed (low heat-up rates) and to one inner core rod wherein the deposited soot was consolidated according to an embodiment of the present invention at a relatively high down-drive speed (high heat-up rate)

Numerically, we investigated seven parameters during the preform making process: 1. Initial outerclad $SiO_2$ Soot Density (g/cc); 2. inner Cane Radius (mm); 3. $K_2O$ average. concentration in inner core rod(s) (mol %), which relates to Softening Point (° C.) (Temp. for Viscosity of $10^{7.6}$ Poise); 4. consolidated inner core rod diameter to the consolidated over clad (outer core) ratio; 5. Hot Zone Peak Temperature ° C.; initial blank Temperature ° C., and 6. soot/inner cane preform Heating Rate (° C./min). Among these parameters, a faster heating rates (some of the modeled results are depicted in experimentally done by increasing downdrive speeds into a hot zone) minimized puddling. FIG. 3 is a plot of the inner core rod (in this example, alkali doped core cane) radii of four different optical performs as a function of axial portion (z) for the lower portion of the optical fiber cane. These plots correspond to three inner core rods (core canes) wherein the deposited soot was consolidated at a relatively low down-drive speed (corresponding to low heat-up rates of 3.1, 3.5 and 3.8° C./min), and to one core cane 144 wherein the deposited soot was consolidated according to an embodiment of the present invention at a relatively high down-drive speed (corresponding to high heat-up rate 7° C./min). The core canes consolidated at a relatively low speed include puddling regions A. FIG. 3 illustrates that puddling was minimized and/or eliminated when sintering was performed at a relatively high sintering rate.

Figure 4A:
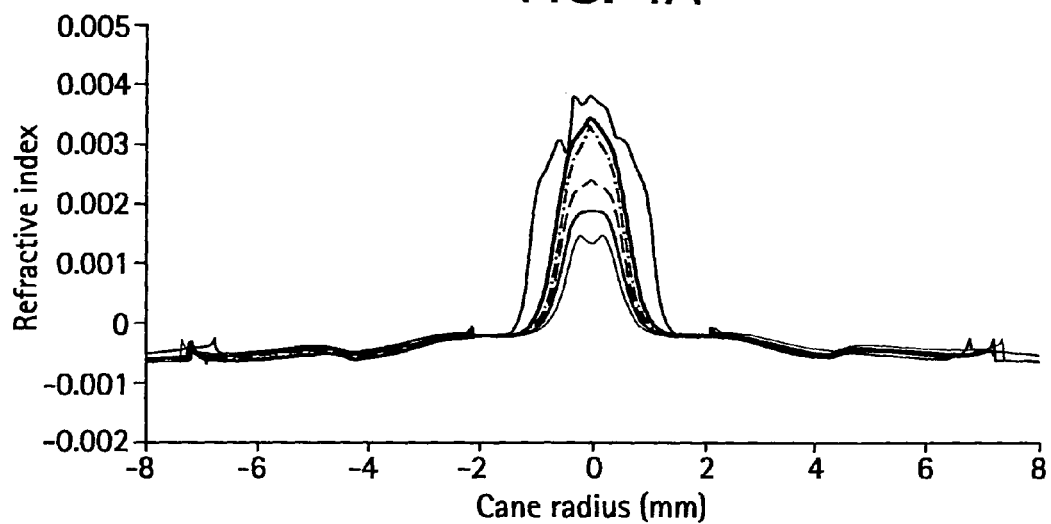
FIG. 4A is shows the typical variation in refractive index profile amongst canes subjected to puddling.

FIG. 4A shows the typical variation in refractive index profile amongst core canes where the puddling phenomenon occurs. This figure illustrates a large variation in index profiles of the six glass rods redrawn from different parts of the core canes from the consolidated preform. The six measurements correspond to six locations, spaced equidistantly, in progressive order from top to bottom of the core cane (the consolidated core cane portion (inner core rod) of the preform). The soot preforms corresponding to refractive index profiles depicted in FIGS. 4A and 4B were identical; they comprised a 1 meter long 16 mm diameter 1 mole % $K_2O$ doped silica core cane overclad with approximately 2700 g of $SiO_2$ soot having a density of 0.4 g/cc (0.37 core/clad target; core cane diameter to total blank diameter). The consolidation of the soot preforms were performed under the same conditions except, during sintering, the down drive speed of the soot preform corresponding to FIG. 4A was 7 mm/min (corresponding to a heating rate of 3.5° C./min). Consolidating the preform using slower down-drive speed allows the core rod to heat sufficiently to puddle, before the over clad (e.g., silica soot) consolidates and/or becames rigid enough to constrain the core rod from deforming.

Figure 4B:
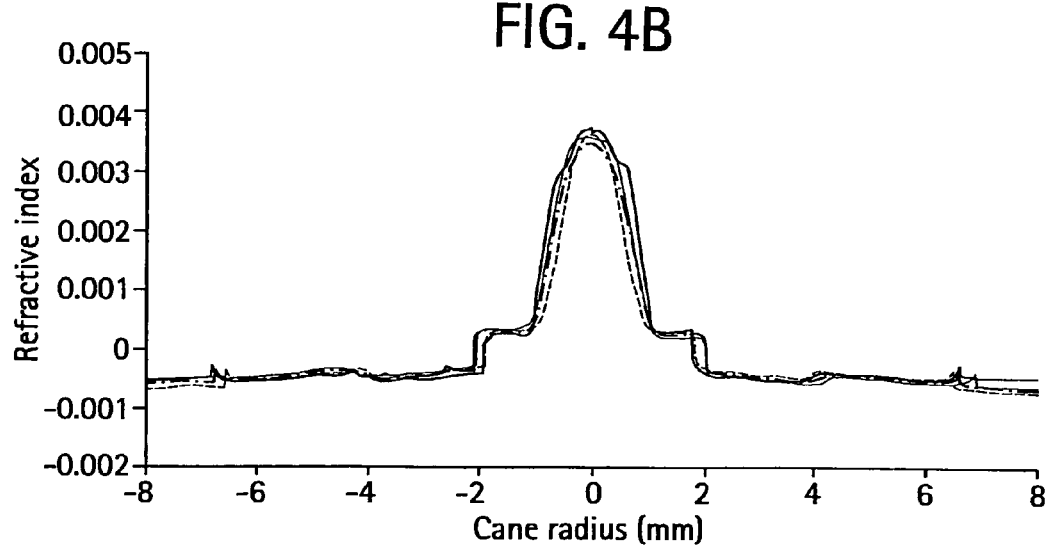
FIG. 4B illustrates refractive index profiles of the glass inner core rods redrawn from different parts of the consolidated canes made according to the embodiments of present invention.

FIG. 4B illustrates refractive index profiles of the glass canes redrawn from different parts of the consolidated central cane portion (core rod 144) of the performs made according to the present invention. This figure shows that there is very little variation in the four refractive index profiles. The four measurements correspond to four locations, spaced equidistantly, in progressive order from top to bottom of the cane. In this exemplary embodiment, the reduction in puddling corresponds to down-drive speeds of 14 mm/min (heating rate of 7° C./min). Preferably, the down-drive speed is at least 25 mm/min (heating rate of 12.5° C./min). For example, the down drive speed may be at least 35 mm/min (heating rate of 17.5° C./min), or it may be 40 mm/min (heating rate of 20° C./min), 50 mm/min (heating rate of 25° C./min), 100 mm/min (heating rate of 50° C./min), 120 mm/min (heating rate of 60° C./min), 150 mm/min (heating rate of 75° C./min), 200 mm/min (heating rate of 100° C./min), or any speed there between.

Figure 5:
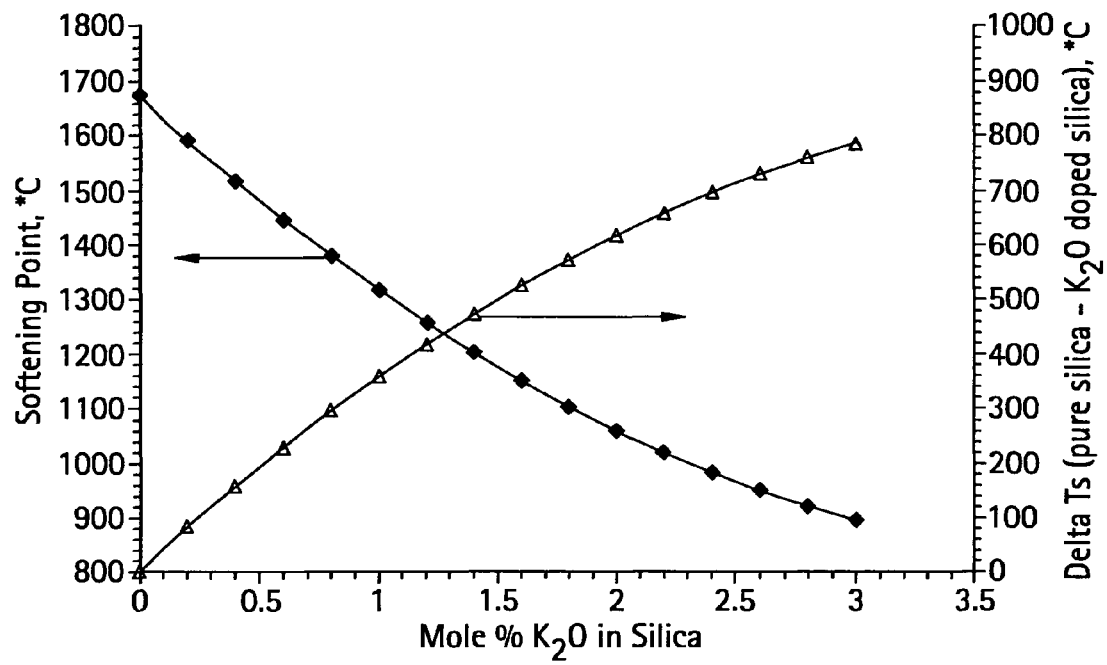
FIG. 5 is a graph of softening point ($T_s$, in degrees C.), and $\Delta T_s$, vs. $K_2O$ concentration in silica glass.

The softening point temperature is that temperature at which viscosity of the glass is $10^{7.6}$ poise. FIG. 5 illustrates graphically a relationship between the softening point (T, in degrees C.) and the $K_2O$ concentration in silica glass. It also illustrates the effect on $\Delta T = T_{s2} - T_{s1}$, if the inner core alkali (e.g., $K_2O$) concentration changes and the surrounding soot is made of pure silica. Table 2, below, provides the softening points for several exemplary glasses, including softening temperatures of a pure silica glass, germania and fluorine doped silica glasses and the corresponding softening temperatures of exemplary alkali doped silica glasses.

TABLE 2

| composition | Softening Point, (viscosity of $10^{7.6}$ poise), degrees C. |
| --- | --- |
| SiO2 | 1673 |
| 92% SiO2 + 8% GeO$_2$ (by wt) | 1641 |
| 82% SiO2 + 18% GeO$_2$ (by wt) | 1603 |
| 64% SiO2 + 36% GeO$_2$ (by wt) | 1538 |
| 1% F by wt in SiO$_2$ | 1610 |
| 2% F by wt in SiO$_2$ | 1550 |
| 0.2 mole % K$_2$O in in SiO$_2$ | 1590 |
| 0.4 mole % K$_2$O in SiO$_2$ | 1516 |
| 0.6 mole % K$_2$O in in SiO$_2$ | 1446 |
| 0.8 mole % K$_2$O in in SiO$_2$ | 1379 |
| 1 mole % K$_2$O in in SiO$_2$ | 1316 |
| 1.2 mole % K$_2$O in in SiO$_2$ | 1256 |
| 1.4 mole % K$_2$O in in SiO$_2$ | 1201 |
| 1.6 mole % K$_2$O in in SiO$_2$ | 1149 |
| 1.8 mole % K$_2$O in in SiO$_2$ | 1101 |
| 2 mole % K$_2$O in SiO$_2$ | 1057 |
| 2.2 mole % K$_2$O in SiO$_2$ | 1017 |
| 2.4 mole % K$_2$O in SiO$_2$ | 980 |
| 2.6 mole % K$_2$O in SiO$_2$ | 947 |
| 2.8 mole % K$_2$O in SiO$_2$ | 918 |
| 3 mole % K$_2$O in SiO$_2$ | 892 |

Table 2 illustrates that the addition of alkali results in softening temperatures that are significantly lower than that of pure $SiO_2$ glass. Therefore, based on our above hypotheses, this can result in the difficulties in obtaining uniform (sintered) overclad alkali doped inner core rod because the low viscosity inner core rod flows and deforms non uniformly with respect to the overclad (i.e. outer core) during the sintering of the soot preform. This puddling of the preform has been observed experimentally and may represent significant problem.

Figure 6:
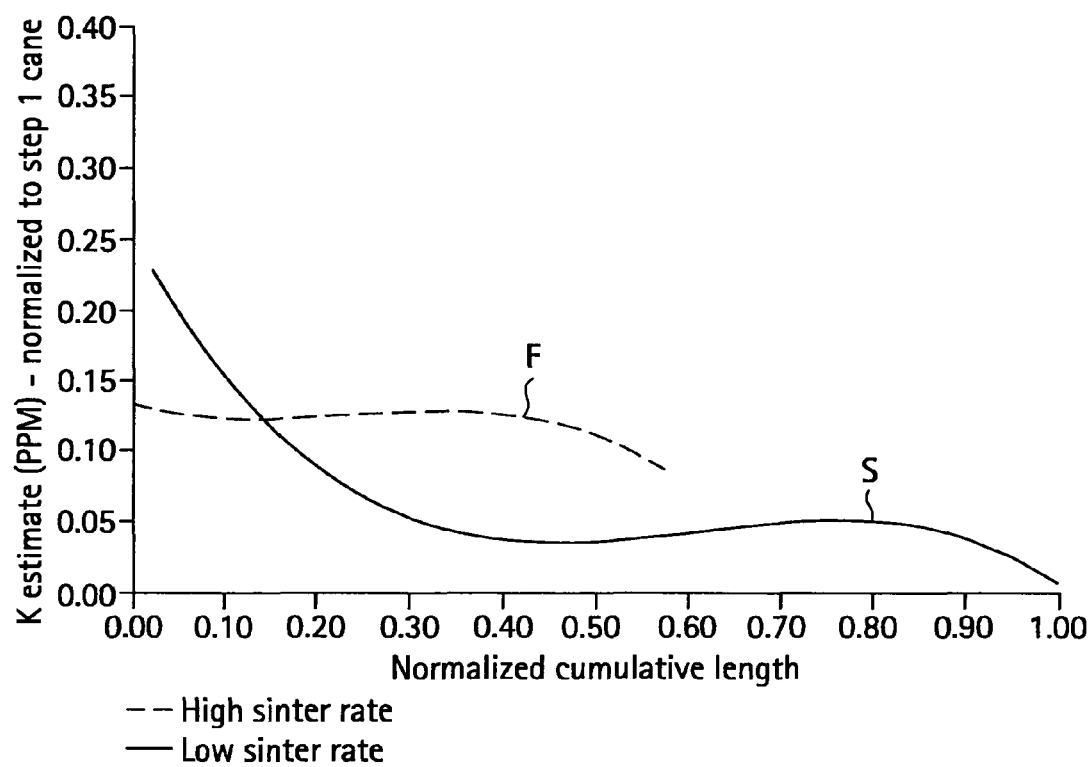
FIG. 6 summarizes the two sets of data, showing estimated potassium level of the inner cane regions (K concentration in the inner core rod versus axial position, after consolidation of the deposited soot, for two differently sintered canes. Data shown is normalized to the K concentration in the initial alkali doped cane (also called Step 1 cane)

FIG. 6 summarizes the two sets of data, showing estimated potassium level versus axial position within the blank. The potassium concentrations at a given axial location in the optical preform can be estimated from the index profiles at that location of the optical preform by radially integrating the index profiles shown, for example, in FIGS. 4A, 4B. The faster rate process (Fast sinter, F) of the present invention results in an axial distribution of potassium which is fairly uniform throughout the blank, whereas the standard sinter (S) speed causes the potassium to concentrate in the lower portion when puddling occurs.

The fiber preforms canes/fiber with alkali doped cores disclosed herein can be fabricated, for example, by providing an alkali doped glass rod and depositing on it silica soot (doped or undoped) by using standard OVD, MCVD, PCVD or VAD methods. However, regardless of the method employed, the core region delta required for the optical fiber requires a ways of incorporating sufficient an alkali (R) such as potassium (K), sodium (Na), rubidium (Rb), lithium (Li) or cesium (Cs), in the core, and are calculated as the corresponding alkali oxide ($R_2O$) as: $K_2O$, $Na_2O$, $Rb_2O$, $Cs_2O$, $Li_2O$), preferably in 0.5-2.5 mole %, more preferably in 0.5-1.5 mole % range.

EXAMPLES

Figure 8:
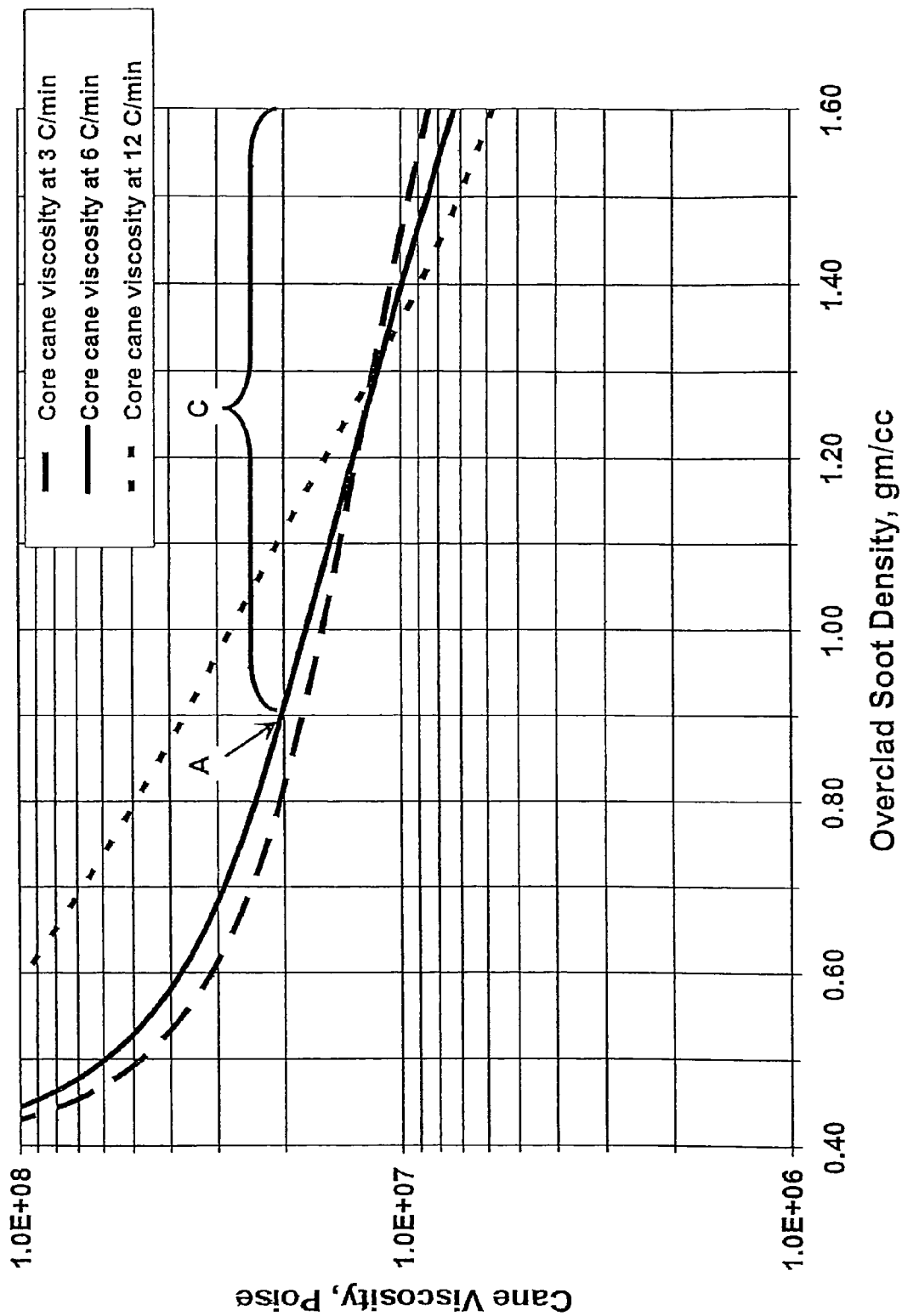
FIG. 8 is a plot of a inner core rod's viscosity as a function of the overclad soot density for the different heating rates.

The invention will be further clarified by the following examples. Reference will now be made in detail to the present preferred embodiments of the invention, examples of which are illustrated in the accompanying drawings. Whenever possible, the same reference numerals will be used throughout the drawings to refer to the same or like parts. One exemplary embodiment of the method of making an optical fiber that incorporates the process of making a fiber core of the present invention is shown in FIG. 8, and is designated generally throughout by the reference numeral 400.

As stated above, by computer numerical modeling, we investigated seven parameters during the preform making process: 1.) initial outerclad $SiO_2$ soot density (g/cc); 2.) inner cane radius (mm); 3.) $K_2O$ average concentration in inner core rod (mol %) which relates to the Softening Point (° C.) (Temp. for Viscosity of $10^{7.6}$ Poise); 4.) consolidated inner core/outer diameter ratio; 5.) Hot Zone Peak Temperature ° C.; 6.) initial blank Temperature ° C.; and 7.) soot/inner core rod preform heating rate (° C./min). Among these parameters, a faster heating rates (some of the modeled results are depicted in experimentally done by increasing downdrive speeds into a hot zone) minimized puddling. As the preform is heated the viscosity of the soot decreases resulting in viscous sintering of the soot; there is also a corresponding viscosity decrease of the alkaline doped core cane (inner core rod 144). The viscosity decrease in the alkaline doped core rod 144 can be large as the temperature is increased due to the $K_2O$ doping of the core rod 144 (see FIG. 5). If the viscosity of the cane becomes low enough before the surrounding soot has sufficiently high density to support the cane, the alkali doped cane will flow with respect to the overclad portion of the preform, thus resulting in puddling. This puddling limits the use of the useful portion of the optical preform due to redistribution of the alkali concentration along the axial length of the preform. Through the computer numerical modeling, we have identified that puddling will occur if the alkali doped core cane reaches a viscosity of $2 \times 10^7$ Poise (20,000,000 Poise) before the overclad silica soot reaches an average density of 0.9 g/cc. We have discovered that this puddling problem can be solved if the overclad silica soot reaches an average density of 0.9 g/cc before the alkali doped core cane reaches a viscosity of $2 \times 10^7$ Poise. These results are shown in Table 3 and FIG. 8.

TABLE 3

| Example | K2O Avg. conc. in cane (mol %) | Softening Point (°C) of core cane, Tcore (Temp. for Viscosity of 10^7.6 Poise) | Softening Point (°C) of clad, Tclad (Temp. for Viscosity of 10^7.6 Poise) | Softening Point (°C) delta Ts, Tclad − Tcore (Temp. for Viscosity of 10^7.6 Poise) | Cane Diameter (mm) | Initial overclad Soot Density (g/cc) | cane/clad ratio | Hot Zone Peak Temp., °C. |
|---|---|---|---|---|---|---|---|---|
| 1 | 1 | 1316 | 1673 | 357 | 16 | 0.4 | 0.37 | 1550 |
| 2 | 1 | 1316 | 1673 | 357 | 16 | 0.4 | 0.37 | 1550 |
| 3 | 1 | 1316 | 1673 | 357 | 16 | 0.4 | 0.37 | 1550 |
| 4 | 1 | 1316 | 1673 | 357 | 16 | 0.4 | 0.37 | 1550 |
| 5 | 0 | 1673 | 1673 | 0 | 16 | 0.4 | 0.37 | 1550 |
| 6 | 0 | 1673 | 1673 | 0 | 16 | 0.4 | 0.37 | 1550 |
| 7 | 0 | 1673 | 1673 | 0 | 16 | 0.4 | 0.37 | 1550 |
| 8 | 1 | 1316 | 1673 | 357 | 16 | 0.4 | 0.30 | 1550 |
| 9 | 1 | 1316 | 1673 | 357 | 16 | 0.4 | 0.30 | 1550 |
| 10 | 1 | 1316 | 1673 | 357 | 16 | 0.4 | 0.30 | 1550 |
| 11 | 1 | 1316 | 1673 | 357 | 16 | 0.4 | 0.37 | 1600 |
| 12 | 1 | 1316 | 1673 | 357 | 16 | 0.4 | 0.37 | 1575 |
| 13 | 1 | 1316 | 1673 | 357 | 16 | 0.4 | 0.37 | 1550 |
| 14 | 1 | 1316 | 1673 | 357 | 16 | 0.4 | 0.37 | 1550 |
| 15 | 1 | 1316 | 1673 | 357 | 16 | 0.4 | 0.37 | 1550 |
| 16 | 1.25 | 1175 | 1660 | 485 | 16 | 0.6 | 0.37 | 1550 |
| 17 | 1 | 1316 | 1673 | 357 | 12 | 0.6 | 0.37 | 1550 |
| 18 | 1 | 1316 | 1673 | 357 | 20 | 0.4 | 0.37 | 1550 |

| Example | Dry Zone Temp. °C. | Heating Rate (°C./min) | Number of passes through Hot Zone | Cane E_mod in dynes/cm^2 for soot density of 0.9 gm/cc | Cane viscosity (Poise) for soot density of 0.9 gm/cc | core cane puddling |
|---|---|---|---|---|---|---|
| 1 | 1000 | 3 | 1 | 5.33E+07 | 1.78E+07 | yes |
| 2 | 1000 | 6 | 1 | 6.10E+07 | 2.03E+07 | no |
| 3 | 1000 | 12 | 2 | 1.12E+08 | 3.73E+07 | no |
| 4 | 1000 | 25 | 5 | 1.03E+08 | 3.44E+07 | no |
| 5 | 1000 | 3 | 1 | 4.24E+10 | 1.41E+10 | no |
| 6 | 1000 | 6 | 1 | 5.32E+10 | 1.77E+10 | no |
| 7 | 1000 | 12 | 2 | 1.20E+11 | 4.00E+10 | no |
| 8 | 1000 | 3 | 1 | 8.29E+07 | 2.76E+07 | no |
| 9 | 1000 | 6 | 1 | 1.38E+08 | 4.60E+07 | no |
| 10 | 1000 | 12 | 2 | 4.40E+08 | 1.47E+08 | no |
| 11 | 1225 | 12 | 1 | 8.56E+07 | 2.85E+07 | no |
| 12 | 1225 | 12 | 1 | 8.56E+07 | 2.85E+07 | no |
| 13 | 1225 | 12 | 1 | 8.56E+07 | 2.85E+07 | no |
| 14 | 1000 | 25/3 | 2 | 1.03E+08 | 3.44E+07 | no |
| 15 | 1000 | 25/12/3 | 3 | 1.03E+08 | 3.43E+07 | no |
| 16 | 1000 | 12 | 2 | 6.07E+07 | 2.02E+07 | no |
| 17 | 1000 | 12 | 2 | 6.92E+07 | 2.31E+07 | no |
| 18 | 1000 | 6 | 1 | 1.30E+08 | 4.33E+07 | no |

The results shown in FIG. 8 are for identical preforms as shown in Examples 1, 2 and 3 (Table 3), but the preforms were heated (or consolidated) at the rate of 3° C./min, 6° C./min, and 12° C./min, respectively. Analysis has shown that puddling will occur if the alkali doped core cane (core rod) reaches a viscosity of $2 \times 10^7$ Poise (20,000,000 Poise) before the overclad silica soot reaches an average density of 0.9 g/cc (Point A, FIG. 8); this occurred when the preform was heated at 3° C./min (Example 1). Analysis also showed that the puddling problem was solved when the overclad silica soot reached a average density of 0.9 g/cc (Point A, FIG. 8) before the alkali doped core rod 144 reached a viscosity of $2 \times 10^7$ Poise (range C, FIG. 8). This occurred when the preform was heated at $\geq 6°$ C./min, specifically 6° C./min, and 12° C./min (Examples 2 and 3, respectively). Thus, it is preferable that silica soot is being consolidated by being heated at a heating rate sufficient to densify the soot to at least 0.9 gm/cc before the viscosity of the core rod (inner core) dips below $2 \times 10^7$ Poise. Note that in some cases shown in Table 3 it was necessary to subject the preform assembly to multiple passes through the temperature ramp. This was performed in order to sinter the overclad soot to fully consolidated non-porous glass since the hot zone of 1400-1600° C. in a consolidation furnace used in this work was approximately 30 cm in length and the temperature below the hot zone dropped back to about 1000° C. A furnace could be designed to just ramp the preform at $\geq 6°$ C./min to prevent puddling and then hold the preform at an elevated temperature of between 1400 to 1600° C. to complete the sintering phase and producing a fully consolidated non-porous puddle-free preform. Also, Table 3 shows results that once a soot preform was sintered rapidly in the initial heating passes through the hot zone, it could then be further heated at the same or slower rates and produce a good quality preform without puddling. (See, for example, examples 3, 5, 7, 10 and 14-17 of Table 3.) Also note that we found that when increasing the softening point differences between the core cane and the overclad silica by adding more alkali to the core cane (Example 16 verses Examples 2 and 3 of Table 3) one could still achieve consolidated overclad preforms without puddling when sintered at the increased sintering rate of 12° C./minute, thus showing that the heating rate can be adjusted to accommodate larger softening point differences between the core and clad glasses.

Example 1

Figure 7:
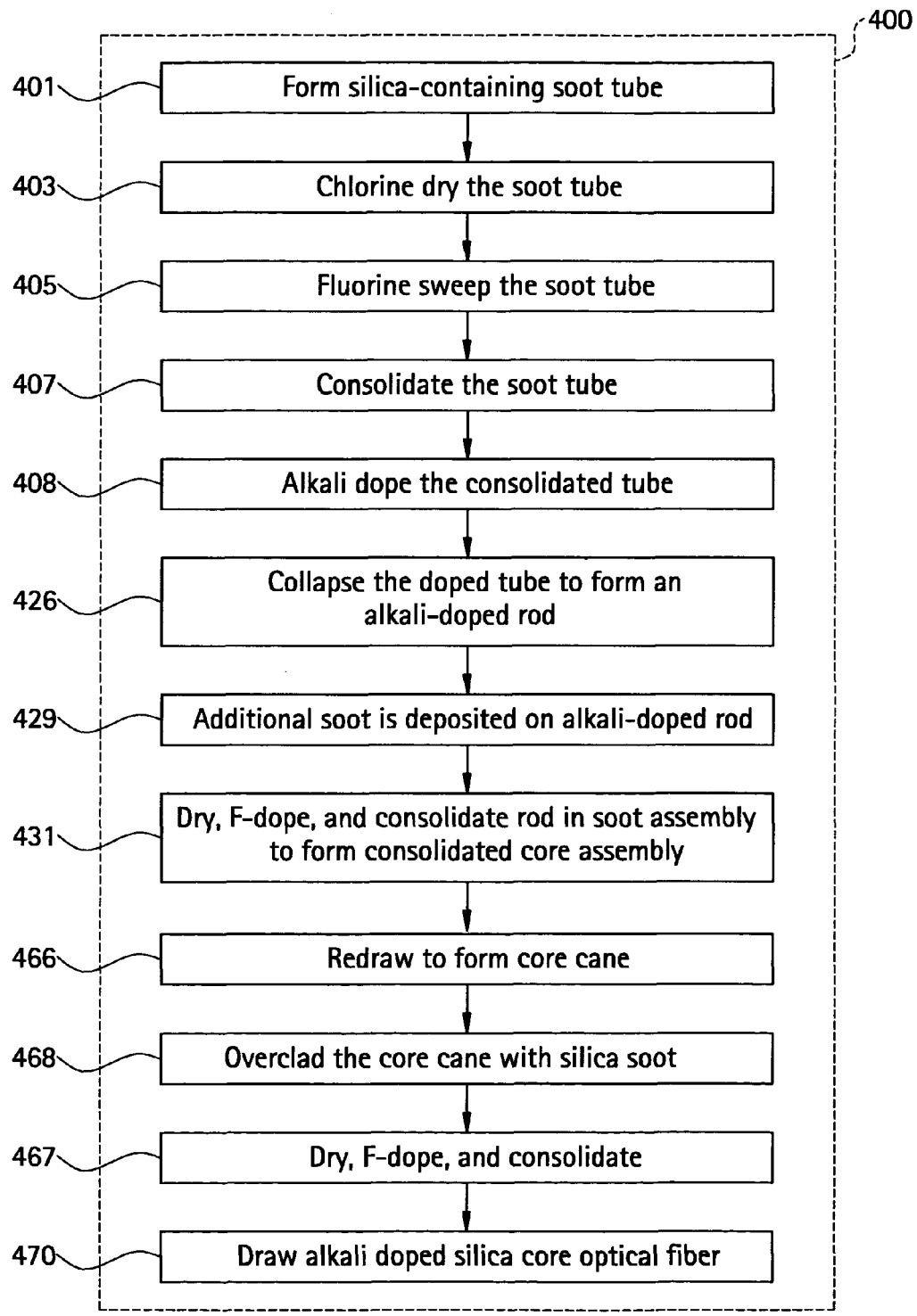
FIG. 7 illustrates a method of manufacturing an alkali metal oxide-doped optical fiber according to one embodiment of the present invention.
Figure 9:
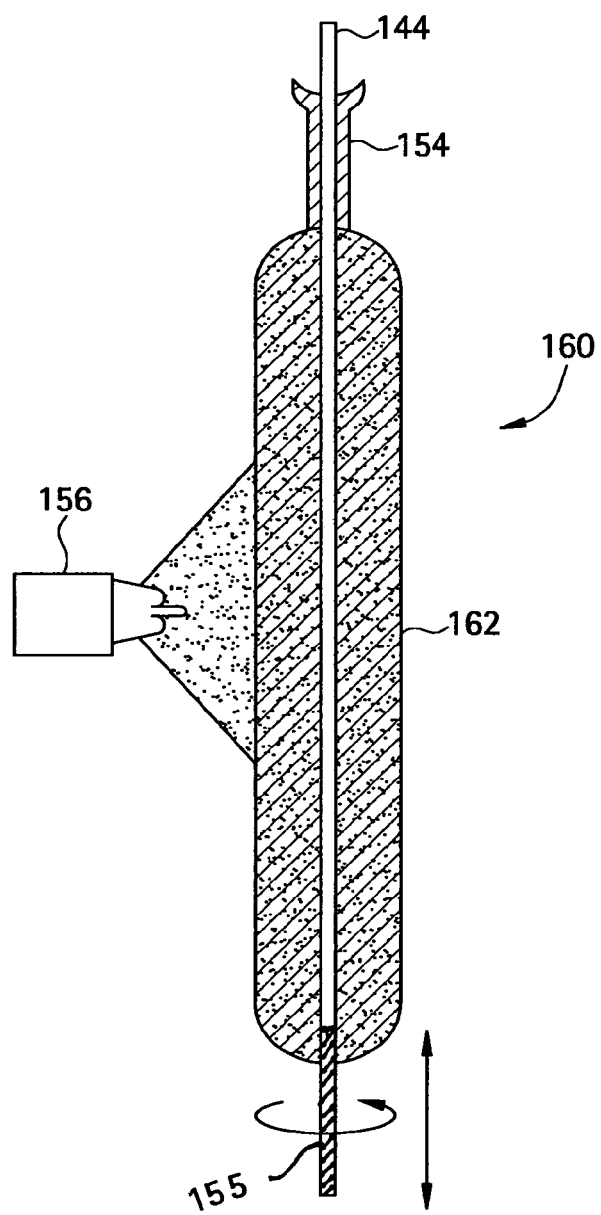
FIG. 9 shows a method of depositing glass soot.

Illustrated in FIG. 7 is a first exemplary method 400, in accordance with embodiments of the present invention, for producing an alkali-doped optical cane (and then fiber) by diffusing an alkali metal oxide into a suitable silica glass article that is a precursor inner core cane. A first step 401 of the method 400 is shown and described with reference to FIGS. 7 and 9. Referring to FIG. 9 which is an illustration of a conventional outside vapor deposition process, at least one soot burner 156 is used to deposit multiple layers of silica soot 162 onto a core rod 144 to form soot preform 160. The resultant soot preform is then dried (step 403) using standard chlorine drying techniques. In this embodiment, the soot is then doped with fluorine (step 405) by exposing the soot to an atmosphere of a fluorine containing compound (e.g., $SiF_4$) for a time and at a temperature sufficient to result in removal of much or all of the chlorine remaining from the drying step. The exposure to a fluorine-containing atmosphere (fluorine sweep) is done at temperatures preferably less than about 1100° C. to avoid doping the glass with high levels of fluorine. Low levels of fluorine doping are desirable, i.e., 0.1 to 0.4 wt. % fluorine, for example. The resultant fluorine (and potentially chlorine) doped soot tube is then consolidated (step 407).

The consolidated glass tube is then alkali doped (step 408). For example, referring to FIG. 10, the resultant glass tube 106 is preferably first mounted between chucks in a lathe 101 (such as a glass-working lathe or a conventional modified chemical vapor deposition (MCVD) glass-forming lathe). A preferably annular reservoir 108 for receiving an alkali metal source compound 110 is formed near one end of tube 106 by forging two annular neck-like deformations 112 in the wall of tube 106 by flame working or otherwise welding the reservoir to the tube. Other types of reservoir may be also used. Preferably, the annular neck-like deformations 112 are about 2 cm from each other. Preferably, to prevent crystallization of the alkali metal, it is desirable that tube 106, and any additional glass deposited on the inside of tube 106, be essentially chlorine free. By essentially chlorine free we mean exhibiting a chlorine content sufficiently low that optical losses due to alkali chloride crystallization are avoided. A chlorine content preferably less than about 500 ppm by weight is desired for this purpose; more preferably less than about 100 ppm by wt.; and most preferably less than about 50 ppm by wt. In addition, silica glass tube 106, and any additional glass deposited therein, should be essentially free of "water". By "water" we mean the hydroxyl group OH. Water is responsible for an absorption peak at or about 1383 nm and which absorption peak may extend into the operating wavelength regions of an optical fiber. This peak may have a detrimental effect on the fiber attenuation. Therefore, it is desirable to reduce the absorption peak, also referred to as the water peak, by reducing the OH content of the glass as much as possible. Preferably, in this exemplary embodiment, glass tube 106 contains less than about 100 ppb by wt. OH; and more preferably less than about 20 ppb by wt. To ensure that starting glass articles are essentially free from water prior to diffusing an alkali metal oxide dopant, conventional chlorine drying techniques may be employed during manufacture of the silica glass tube.

Referring again to FIG. 10, alkali source compound 110 is introduced into tube 106 at reservoir 108 and heated by heat source 114 to form a vapor as tube 106 is rotated. Oxygen or a carrier gas is flowed into the inlet 116 of tube 106 through rotating seal 118, and portion 120 of tube 106 downstream of the alkali metal oxide source compound 110 is heated to facilitate diffusion of the alkali metal oxide into interior surface 122 of tube 106. Preferably, the tube 106 does not have any preform components inserted therein, such as another glass rod or the like. The portion 120 of tube 106 downstream of the alkali metal oxide source compound 110 should be heated to a temperature sufficient to promote rapid diffusion of the alkali into surface 122 and to prevent devitrification of the glass. Preferably, portion 120 of tube 106 downstream of alkali metal oxide source compound 110 is heated by heat source 124 to above 1500° C.; more preferably between about 1500° C. and 2000° C. Preferably, heat source 124 is traversed along the length of portion 120 of tube 106. Alkali metal oxide source compound 112 preferably comprises an element selected from the group consisting of K, Na, Li, Cs, and Rb. Preferably, alkali metal oxide source compound 110 is a bromide, iodide or fluoride. Most preferably, the alkali metal oxide source compound 110 is KBr, KI or $KNO_3$. The alkali metal oxide (e.g., $K_2O$, $Na_2O$, $LiO_2$, $Rb_2O$, $Cs_2O$ and mixtures thereof) is preferably diffused throughout a depth of between about 100 microns and 500 microns from the inside diffusion surface 122 of tube 106 prior to collapse of tube 106 thereby forming an alkali oxide doped glass tube. In particular, it is preferred that the diffused alkali metal oxide dopant concentration (in wt. %) in the tube varies radially. Preferably, the glass article (e.g. tube 106) is doped such that the concentration is highest on an inner half portion 107 and lower in an outer half portion 109, as shown in the enlarged view of FIG. 10. The demarcation point between the inner and outer half portions is defined by and located at half the radial thickness (illustrated by dotted line 111) of the tube 106. For example, the diffusion is preferably such that the peak concentration of alkali dopant in the outer half portion 109 is less than 50% of the peak concentration (in wt. %) of the inner half portion 107.

The diffusion process may be followed by the step of further heating tube 106 to promote a partial collapse of tube 106 by conventional methods as are known in the art (or by the dry methods described herein) to both reduce the inside surface area through which the alkali metal oxide might be lost and to thicken the layer of glass into which the alkali metal oxide has been diffused. Once the diffusion doping step, or any partial collapse of tube 106 has been completed, the diffusion surface of the tube 122 may optionally be etched with an etchant, suitable for removing silica glass, to a depth sufficient to remove unwanted impurities that may have diffused through the diffusion surface 122 of the tube. An aqueous. HF solution may be used as an etchant, for example. More preferably, a fluoride gas such as, for example, $CF_4$, $SF_6$, $NF_3$, $C_2F_6$ or a mixture thereof, is employed. The amount of material removed from inner surface 122 is dependent upon processing conditions during diffusion and any partial tube collapse, but the etching conditions are preferably sufficient to result in the removal of glass from surface 122 to a depth of at least about 5 percent of the total diffusion depth of the alkali metal oxide. Once etching is finalized, silica glass tube 106 is further heated with a heat source 124 to collapse tube 106 downstream of alkali metal oxide source compound 110 and form an alkali metal oxide-doped solid glass rod 132. Collapse of tube 106 is accomplished according to conventional methods known in the art, such as heating with a suitable heat source (e.g., a torch). The solid alkali-doped glass rod 132 is then cut from that portion of glass containing alkali metal source compound reservoir 108. Preferably, the solid alkali metal oxide-doped glass rod 132 is etched with a suitable etchant to remove some or all hydrated glass which may have been formed by the torch during collapse of the tube 106. If a dry heat source is used for collapse, for example, an induction or resistance heater, a plasma torch, or a dry heat source which uses a non-hydrogen containing fuel, such as CO, then etching may not be needed. Utilizing a dry heat source for the doping and/or collapsing steps is believed to minimize re-wetting of the outside of the tube, i.e., diffusing OH (water) into the tube from the outside and may, therefore, further reduce fiber attenuation. A dry heat source is one which does not induce any appreciable OH (water) into the tube.

It should be recognized that the alkali-doped rod 132 when collapsed preferably comprises (similar to the tube 106) concentrations of alkali metal oxide that vary radially and which are such that the portion corresponding to the inner half portion 107 has the highest peak concentration (in wt. %) of alkali dopant and the portion corresponding to the outer half portion 109 has a lower peak concentration. Most preferably, the peak concentration of alkali dopant is at the center of the rod and the concentration at half the radius is less than 50% of the peak concentration; and more preferably less than 25%.

Doped glass rod 132 may be heated in a redraw furnace 136 and drawn into a smaller diameter glass rod 144. This redraw process is illustrated in FIG. 11. A glass handle 130 is attached to the alkali-doped glass rod 132 resulting from the collapse stage described supra and the alkali-doped glass rod 132 is mounted in a moving downfeed support 134 above a conventional redraw furnace 136. A sacrificial glass rod 138, which may be attached to the bottom of alkali-doped glass rod 132, is pulled by motor-driven tractors 140, thereby causing the alkali-doped glass rod 132 to be drawn at a suitable rate. A rate of 15 to 23 cm/min has been found to be adequate, the rate being largely controlled in response to the diameter measured by sensor 142. The outer diameter dimension (d1) of the small diameter glass rod 144 resulting from the drawing process is preferably in the range of 3 mm to 10 mm; more preferably less than 6 mm in diameter dimension. If the diameter dimension of rod 132 resulting from collapse step 426 is within the desired range, rod 132 resulting from collapse step 126 may be used as glass core rod 144. The small diameter glass core rod 144 should have a peak concentration of $K_2O$ of more than 0.5 wt %, preferably between about 1 wt. % and 5 wt. %. In particular, having a very small diameter of the alkali-doped rod is advantageous because this concentrates the transition metal impurities present in the rod very near the fiber's centerline where their negative impact is minimized.

As indicated by step 429 of method 402, once formed, small diameter glass core rod 144, corresponding to the inner core, is further overclad.

For example, as illustrated in FIG. 9, the small diameter alkali-doped glass inner core rod 144 may be used as a starting rod upon which additional porous glass soot 162 is deposited as overclad (i.e., outer core) using an OVD method, as is known in the art, to form an assembly 160 (Step 42*a*). A typical outside vapor deposition method is illustrated in FIG. 9. As shown in FIG. 9, a glass handle 154 is attached to small diameter alkali-doped glass rod 144 (corresponding to the inner core) manufactured, for example as heretofore described, and becomes an integral part of the resulting preform. Handle 154 provides a method of supporting the silica glass preform resulting from the deposition process during later processing steps. A short glass support rod (also called tail stock) 155 is fusion welded (fused) to the lower portion of core rod 144. The tail stock 155 is preferably comprised of silica or more preferably fluorine or germania doped silica, and extends 1-20 cm into the soot preform section 162. Glass handle 154 and tail stock 155 are temporary fixtures to aid the manufacturing process and are not part of the final optical fiber produced from this preform. It is noted that the tail stock 155 preferably acts as a plug to keep the core rod 144 from flowing out during consolidation. Preferably, the tail stock 155 is Ge or F doped silica. The glass core rod 144 (inner core rod) having the attached handle 154 is mounted in a lathe where it is rotated and translated with respect to burner 156 which may be, for example, of the type disclosed in U.S. Pat. No. 4,165,223. Fuel gas and oxygen, or air, are supplied to burner 156 from a source (not shown). This mixture is burned to produce a flame which is emitted from burner 156. A silica precursor gas-vapor mixture is oxidized within the flame to form a silica-containing soot stream 158 which is directed toward glass core rod 144. Suitable means for delivering the gas-vapor mixture to burner 156 are well known in the art; for an illustration of such means reference is made to U.S. Pat. Nos. 3,826,560, 4,148,621 and 4,173,305. Composite soot preform 160 is formed by traversing glass rod core 144 many times with respect to burner 156 to cause a build-up of many layers of silica soot-containing to form soot coating 162. The translating motion could also be achieved by moving burner 156 back and forth along rotating glass core rod 144 or by the combined translational motion of both burner 156 and glass core rod 144. Soot coating 162 forms at least a portion of the core glass of the composite preform 160 which is preferably comprised of substantially pure silica. Preferably, the soot coating has a density greater than 0.25 g/cc, more preferably greater than 0.35 g/cc, more preferably between about 0.35 g/cc and 0.5 g/cc. The composite preform 160 is then dried by exposing it to a chlorine-containing gas while being heated in a furnace to a temperature of about 1000° C. The preform 160 is then optionally fluorine doped. During the fluorine doping step, the preform 160 is preferably fluorine doped by exposing the preform to a fluorine-containing gas at temperatures (e.g. about 1000° C.) suitable for causing the soot to become doped with the fluorine. In this way, the outer core region is formed. However the fluorine doping step is only carried out long enough to allow a relatively small amount of fluorine (0.1 wt % to 0.4 wt %), for example. The preform is then consolidated by heating the preform 160 to a suitable temperature for consolidating the preform.

More specifically, as shown in FIG. 12 a soot laden preform 160 is situated in a consolidation furnace and is gradient sintered in a hot zone having temperatures between 1000° C. and 1600° C., more preferably between 1200° C. and 1600° C., most preferably between 1400° C. and 1550° C. The heating rate and/or down drive speed (i.e., the vertical speed of preform relative to the hot zone) is sufficient to permit soot consolidation, so as to (i) render the densified material with enough rigidity to confine the heated inner core rod so as to prevent it from puddling, and/or (ii) before the inner core rod heats up so as to soften sufficiently to puddle, and/or (iii) densify the soot to form a glass clad while maintaining the ratio of inner core/outer core diameter within 10%. Preferably, the relatively fast heating rate is at least 6° C./min. For example, the this speed may be at least 7° C./min, or it may be 12° C./min, 25° C./min, 50° C./min; 60° C./min; 75° C./min, 100° C./min, or any speed there between. By reducing puddling, the change of inner core diameter to outer blank diameter becomes less than 10% along at least 75%, and preferably over 95%, of the axial length of the consolidated preform (cane). Most preferably at least 98% of the consolidated preform exhibits less than 10% change of inner core diameter to outer blank diameter. Preferably, the down-drive speed is at least 25 mm/min. For example, the down drive speed may be at least 35 mm/min, or it may be 40 mm/min, 50 mm/min, 100 mm/min; 125 mm/min, 150 mm/min, 200 mm/min, or any speed there between.

Composite preform 160 is heated in consolidation furnace 178, shown in FIG. 12, to form consolidated optical fiber preform 164. Consolidation furnace 178 comprises a high silica content muffle 180 surrounded by heating elements 182. A high silica content liner 184 typically separates heating elements 182 from muffle 180. The term "high silica content" as used herein means pure fused silica or a high silica content glass such as a borosilicate glass. Consolidation gases 186 are fed to the bottom of muffle 184 through a conical section 188 which is affixed thereto. Conical section 188 is supported by rings and 192. The consolidation gases 186 flow through one or more holes in conical section 188.

The consolidation atmosphere may contain helium (about 1 standard liter/min), oxygen, and an chlorine (40 to 50 standard cm/min) to aid in water removal from the preform. In particular, chlorine permeates the interstices of the soot preform and flushes out any OH, $H_2$ or $H_2O$ contained therein. Soot contains core preform 160 is then heated at a high temperature (generally in the range of between about 1450° C. to about 1600° C., depending upon preform composition) until the deposited soot consolidates and transforms into a solid, high-purity glass having superior optical properties. Once preform 160 is consolidated into the optical fiber core cane 164, the resultant core cane 164 is removed from the furnace and transferred to an argon-filled holding vessel.

The resultant clear glass core cane may then be redrawn to form a second core rod, i.e. a glass rod which contains at least a portion of the core of an optical fiber drawn therefrom (step 466, FIG. 7). The second core rod may then further processed by adding additional glass, either by sleeving with a glass tube (either a glass tube or soot tube), through depositing glass soot by chemical vapor deposition (step 468, FIG. 7), for example, by both sleeving and chemical deposition, or through other methods as are known in the art, to form a complete optical fiber preform ready to be drawn into an optical fiber. The additional glass may comprise core glass, cladding glass or both core and cladding glass. Further, the additional glass may take one or more several additional deposition steps to achieve the desired thickness, wherein after each step, the soot is dried, doped, consolidated and redrawn into a smaller diameter rod. After the final consolidation step (e.g. Step 467, FIG. 7) the cane may be drawn into optical fiber (step 470, FIG. 7).

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of manufacturing optical fiber cane comprising the steps of:
   (i) providing a core rod comprising relatively low viscosity glass having a softening point, $T_{s1}$, at $10^{7.6}$ poise of less than or equal to 1470° C., said low viscosity glass including at least 0.5 mole % alkali dopant;
   (ii) depositing relatively high viscosity $SiO_2$ based soot around said core rod to form a soot preform, said relatively high viscosity $SiO_2$ based soot having a softening point, $T_{s2}$ at $10^{7.6}$ poise of greater than or equal to 1600° C., wherein the softening point $T_{s1}$ of the low viscosity glass is at least 200° C. lower than the softening point $T_{s2}$ of the relatively high viscosity $SiO_2$ based soot; and
   (iii) consolidating said relatively high viscosity $SiO_2$ based soot on said core rod by exposure to a hot zone at a temperature T of 1000° C.$\leq$T$\leq$1600° C., by heating an outer portion of said soot preform at a relatively fast heating rate sufficient to densify said soot before the core rod softens sufficiently to start puddling, said heating rate being at least 12° C./min.

2. The method of manufacturing optical fiber cane according to claim 1, wherein said relatively fast heating rate is at least 25° C./min.

3. The method of manufacturing optical fiber cane according to claim 1, wherein said relatively fast heating rate is at least 50° C./min.

4. The method of manufacturing optical fiber cane according to claim 1 wherein a ratio of a change of an inner core diameter to an outer core clad diameter is within ±5% over at least 80% of an axial length of said core rod.

5. The method of manufacturing optical fiber cane according to claim 1 wherein said core rod comprises sodium or potassium doped silica.

6. The method of manufacturing optical fiber cane according to claim 5 wherein said core rod comprises 0.5% to 5 wt % potassium.

7. The method according to claim 1, said heating rate being sufficient to densify said soot in the hot zone to at least 0.9 g/cc before a viscosity of the core rod drops below $2\times10^7$ Poise in the hot zone.

8. A method of manufacturing optical fiber cane comprising the steps of:
   (i) providing a core rod comprising relatively low viscosity glass comprising at least 0.5 mole % alkali dopant;
   (ii) depositing relatively high viscosity Si based soot around said core rod to form a soot preform, said core rod having a softening point at least 200° C. lower than a softening point of said relatively high viscosity Si based soot; and
   (iii) consolidating the relatively high viscosity Si based soot on said core rod by exposure to a hot zone at a temperature T of 1200° C.$\leq$T$\leq$1600° C., by heating an outer portion of said soot preform at a relatively fast heating rate sufficient to densify said soot before a viscosity of the core rod in the hot zone decreases to less than $2\times10^7$ poise to prevent the core rod from puddling.

9. The method of method of manufacturing optical fiber cane according to claim 8, wherein said relatively fast heating rate is at least 12° C./min.

10. The method of claim 8, wherein said ratio of the change of said inner core diameter to said outer core clad diameter is within ±5% over at least 80% of an axial length of said core rod.

11. A method of manufacturing optical fiber cane comprising the steps of:
   (i) providing a core rod comprising relatively low viscosity glass having an alkali dopant;
   (ii) depositing relatively high viscosity Si based soot around said core rod to form a soot preform, wherein a softening point of the core rod is at least 300° C. lower than a softening point of the relatively high viscosity Si based soot at $10^{7.6}$ Poise;
   (iii) consolidating said relatively high viscosity Si based soot of said soot preform on said core rod by exposure to a hot zone having a temperature T of 1200° C.$\leq$T$\leq$1600° C. by heating an outer portion of said soot preform at a relatively fast heating rate sufficient to densify said soot before a viscosity of the core rod drops below $2\times10^7$ Poise in the hot zone, said heating rate being at least 12° C./min.

12. The method according to claim 11, wherein said soot preform is moved through said hot zone at a relatively fast speed, said speed being sufficient for the relatively high viscosity Si based soot to achieve the density of at least 0.9 g/cc in the hot zone before a viscosity of the core rod drops below $2 \times 10^7$ Poise in the hot zone.

13. The method according to claim 11 wherein one end of the core rod is fused to a tail stock.

14. A method of manufacturing optical fiber cane comprising the steps of:
   (i) providing a core rod comprising relatively low viscosity glass having an alkali dopant;
   (ii) depositing Si based soot around said core rod to form a soot preform, said Si based soot having a relatively high viscosity, such that the softening point of the core rod is at least 200° C. lower than the softening point of the Si based soot at $10^{7.6}$ poise;
   (iii) consolidating said Si based soot of said soot preform on said core rod by exposure to a hot zone at a temperature T of $1200° C. \leq T \leq 1600° C.$ by heating an outer portion of said soot preform at a relatively fast heating rate sufficient to densify said soot before a viscosity of the core rod in the hot zone decreases to less than $2 \times 10^7$ Poise.

15. The method of manufacturing optical fiber cane according to claim 14, wherein a relative movement of the soot preform to the hot zone is at least 25 mm/min when the soot preform is in the hot zone.

16. The method of manufacturing optical fiber cane according to claim 14, wherein a relative movement of the soot preform to the hot zone is at least 35 mm/min when the soot preform is in the hot zone.

17. The method of manufacturing optical fiber cane according to claim 14, wherein the relative movement of the soot preform to the hot zone is at least 50 mm/min when the soot preform is in the hot zone.

18. The method of manufacturing optical fiber cane according to claim 14, wherein said consolidating is performed in He atmosphere.

19. The method of manufacturing optical fiber cane according to claim 14, wherein the heating rate is at least 12° C./min.

20. The method of manufacturing optical fiber cane according to claim 14, wherein the heating rate is at least 25° C./min.

21. The method of manufacturing optical fiber cane according to claim 14, wherein the heating rate is at least 50° C./min.

* * * * *